(12) United States Patent
Chaudhuri et al.

(10) Patent No.: US 8,515,258 B2
(45) Date of Patent: Aug. 20, 2013

(54) DEVICE AND METHOD FOR AUTOMATICALLY RECREATING A CONTENT PRESERVING AND COMPRESSION EFFICIENT LECTURE VIDEO

(75) Inventors: Subhasis Chaudhuri, Maharashtra (IN); Aladukkam Ram Ranjith, Maharashtra (IN); Trupti Narendra Thete, Maharashtra (IN)

(73) Assignee: Indian Institute of Technology, Bombay, Mumbai (IN)

( * ) Notice: Subject to any disclaimer, the term of this patent is extended or adjusted under 35 U.S.C. 154(b) by 11 days.

(21) Appl. No.: 13/202,471

(22) PCT Filed: Feb. 18, 2010

(86) PCT No.: PCT/IN2010/000095
§ 371 (c)(1),
(2), (4) Date: Aug. 19, 2011

(87) PCT Pub. No.: WO2010/095149
PCT Pub. Date: Aug. 26, 2010

(65) Prior Publication Data
US 2011/0305439 A1    Dec. 15, 2011

(30) Foreign Application Priority Data

Feb. 20, 2009  (IN) .............................. 386/MUM/2009

(51) Int. Cl.
*H04N 5/76* (2006.01)

(52) U.S. Cl.
USPC ............................................ 386/285; 386/278

(58) Field of Classification Search
USPC .................................. 386/285, 278, 281, 326
See application file for complete search history.

(56) References Cited

U.S. PATENT DOCUMENTS

| 2005/0213656 A1* | 9/2005 | Liu et al. ................... 375/240.01 |
| 2006/0251382 A1* | 11/2006 | Vronay et al. ................... 386/52 |
| 2007/0124678 A1* | 5/2007 | Agnihotri et al. ............. 715/720 |
| 2008/0184120 A1* | 7/2008 | OBrien-Strain et al. ...... 715/723 |

* cited by examiner

*Primary Examiner* — Robert Chevalier
(74) *Attorney, Agent, or Firm* — Sughrue Mion, PLLC

(57) ABSTRACT

A device and method for automatically recreating a content preserving and compression efficient lecture video is provided. The device comprises of a computer based video recreating means (3) connected to a video receiving means (2) to an input side thereof and to a video reproducing means (4) at the output side thereof, wherein the video recreating means (3) is designed to split the video into visual and audio data, split the visual data into a plurality of scenes, classify each scene into a number of activity scenes, select activity scenes pre-determined to be critical for preserving the semantics of the lecture video and determine a key frame thereof, recreate the visual data by effecting a time based merger of the key frames of the selected activity scenes, recreate the audio data by removing voiceless data and noise therein and recreate the lecture video by effecting a synchronized time based merger of the recreated visual and audio data.

17 Claims, 2 Drawing Sheets

DEVICE AND METHOD FOR AUTOMATICALLY RECREATING A CONTENT PRESERVING AND COMPRESSION EFFICIENT LECTURE VIDEO

CROSS-REFERENCE TO RELATED APPLICATIONS

This application is a National Stage application under 35 U.S.C. §371 and claims benefit of International Application No. PCT/IN2010/000095 having an International Filing Date of Feb. 18, 2010, which claims the benefit of priority of 386/MUM/2009 having a filing date of Feb. 20, 2009.

FIELD OF THE INVENTION

The invention relates to a device and method for automatically recreating a content preserving and compression efficient lecture video.

BACKGROUND OF THE INVENTION

An educational multimedia, for example, a lecture video recorded at a live class room is captured from a plurality of fixed and moving cameras located within the classroom. Usually, such a lecture video is rich with fairly still video images and audio data and contains less moving video content. The video frames are the ones captured from the fixed cameras facing the blackboard, screen of the slideshow or the instructor continuously. The final lecture video is created by effecting time based merger of video and audio data captured from each of the moving and fixed cameras and keeping the instructional value intact. Effecting such a merger is a labor-intensive manual process. Such a lecture video also contains redundant and unstructured data streams that span along the time sequence and consumes a large amount of memory when stored. In a limited bandwidth and storage scenario, storing, browsing and streaming of such a large capacity lecture video is difficult and costly.

OBJECTS OF THE INVENTION

An object of the invention is to provide a device for automatically recreating a content preserving and compression efficient lecture video.

Another object of the invention is to provide a method for automatically recreating a content preserving and compression efficient lecture video.

Another object of the invention is to provide a device and method for automatically recreating a content preserving and compression efficient lecture video which does not suffer from any degradation in audio-video quality.

DETAILED DESCRIPTION OF THE INVENTION

In order to achieve the aforesaid and other objectives, according to the invention, a device is provided for automatically recreating a content preserving and compression efficient lecture video. The device comprises of a computer based video recreating means connected to a video receiving means to an input side thereof and to a video reproducing means at the output side thereof, wherein said video recreating means is designed to split the video into visual data and audio data, split the visual data into a plurality of scenes by determining scene breaks within the visual data, classify each scene based on activities such as a talking head activity scene, a class room activity scene, a writing hand activity scene or a slide show activity scene, select activity scenes pre-determined to be critical for preserving the semantics of said lecture video, determine a key frame within said selected activity scenes, recreate the visual data by effecting a time based merger of the key frames of the selected activity scenes, recreate the audio data by retargeting it to remove voiceless data and noise therein and recreate the lecture video by effecting a synchronized time based merger of said recreated visual and audio data.

In order to achieve the aforesaid and other objectives, according to the invention, a method is provided for automatically recreating a content preserving and compression efficient lecture video. The method comprises the steps of splitting the video into visual data and audio data, splitting the visual data into a plurality of scenes by determining scene breaks within the visual data, classifying each scene based on activities such as a talking head activity scene, a class room activity scene, a writing hand activity scene or a slide show activity scene, selecting activity scenes pre-determined to be critical for preserving the semantics of said lecture video, determining a key frame within the selected activity scenes, recreating the visual data by effecting a time based merger of the key frames of the selected activity scenes, recreating the audio data by retargeting it to remove voiceless data and noise therein and recreating the lecture video by effecting a synchronized time based merger of the recreated visual data and audio data.

These and other aspects, features and advantages of the invention will be better understood with reference to the following detailed description, accompanying drawings and appended claims, in which, FIG. 1 illustrates a block diagram of the device for automatically recreating a content preserving and compression efficient lecture video.

Figure 1:

FIG. 1 illustrates a block diagram of the device for automatically recreating a lecture video without losing the semantics therein. The device comprises of a video receiving means 2, a video recreating means 3 and a video reproducing or recording means 4. The video receiving means 2 and the video reproducing means 4 are operably connected to the input and output sides of the video recreating means 3 respectively. The video receiving means 2 is essentially a device for receiving and reading the lecture video to be recreated including a diskette reader such as a CD-ROM or a DVD or any such device capable of receiving and reading a multimedia file directly from a still or moving video camera. The video from the video receiving means 2 is fed into the video recreating means 3 to be recreated without loosing the semantics therein. The video recreating means 3 is a computer based processing unit designed to perform a series of functions to recreate a compact retargeted representation of the lecture video. The degree of compression in the recreated video can be varied as per the requirement. Such functions include splitting multimedia lecture video into video and audio channels, splitting video data into a plurality of scenes by determining scene breaks within the video data, classifying each scene into a talking head activity scene, a class room activity scene, a writing hand activity scene or a slide show activity scene, selecting activity scenes pre-determined to be critical for preserving the semantics of the lecture video, determining a key frame within said selected activity scenes, selecting distinct key frames by employing skew correction, super-resolving said key frames for each activity scene, recreating the video data by effecting a time based merger of key frames of the selected activity scenes, recreating the audio data by retargeting said audio data for removing voiceless data and noise (including coughing sound) therein and recreating the lecture video by effecting a synchronized time based merger of said recreated video and audio data with an animated marker placed at appropriate locations on the content key frames (such as the position of pen for writing hand or cursor location for slide show), synchronized with the audio about the topic being discussed by the instructor. The video recording means 4 is essentially a device for effecting a further storing, transmission or streaming of the recreated video thereof. Such devices include a diskette writer such a CD ROM writer or a DVD writer, a USB connection or any other connection for the transfer of the recreated video from one medium to the other in same or different format or file type.

Figure 2:
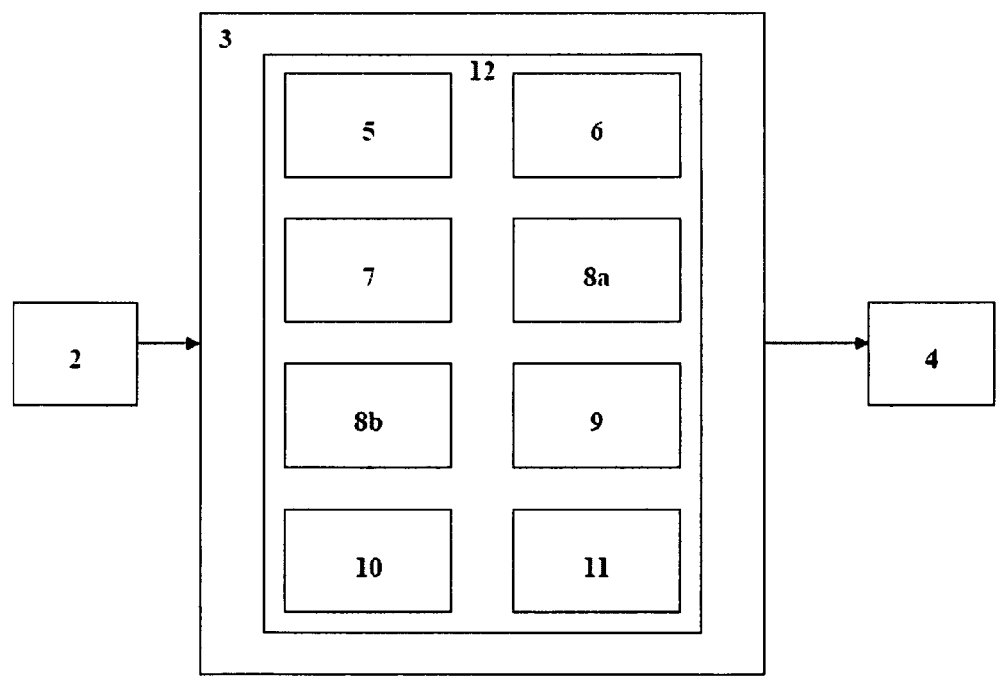
FIG. 2 illustrates a block diagram of the device for automatically recreating a content preserving and compression efficient lecture video according to another embodiment of the invention.

According to another embodiment of the invention, FIG. 2 illustrates a block diagram of the device for automatically recreating a lecture video without losing the semantics therein. The device comprises of a video receiving means 2, a video recreating means 3 and a multimedia reproducing or recording means 4. The video recreating means 3 comprises of a plurality of hardware modules such as a video channel splitter 5, a scene change detector 6, an activity detector 7, a key frame extractor 8a, a skew corrector 8b, an image super-resolver 9, an audio processor 10 and a media recreator 11. Each of the hardware modules are controlled by a processor 12 located within the video recreating means 3. Each hardware module performs a specific function, each function being a contributory step in recreating a compact retargeted representation of the lecture video. The video splitter 5 splits the multimedia lecture video into a visual data and audio data. The video data is fed into the scene change detector 6 and the audio data is fed first into an audio processing block 10 that removes unnecessary pauses and various noisy part (including coughing) from audio data stream and then fed into the media recreator 11. The scene change detector 6 temporally segments the lecture video by detecting scene breaks therein. The activity detector 7 then classifies each of the detected scenes into a talking head activity, a class room activity, a writing hand activity or a slide show activity. Based on a predetermined criteria for preserving the semantics, a few of the above selected activity scenes are processed by the key frame extractor 8a to determine a key frame in each of the selected activity scenes. Multiple key frames of the same content frame are avoided by executing a skew correction of the key frames by the key frame extractor 8a itself or by a separate hardware module 8b located outside thereof. Further, since a single frame selected from the complete video sequence may suffer from poor resolution when viewed statically, the key frames are super-resolved by the super-resolver 9 using a super-resolution framework. Simultaneously, the audio data is recreated by the media recreator 11 by retargeting it to remove spatial redundancies, noise and pauses there from. The selected super-resolved key frames are merged on a time scale by the media recreator 11 to recreate the video data. Subsequently, the recreated video and audio data are merged on a time scale to recreate the lecture video which is a compact retargeted representation of the original lecture video. The degree of compression in the recreated video can be varied by varying the parameters being defined to select the activity scenes for key frame extraction, a typical figure being about 85-90% over and above the compressed video data. The video recording means 4 is essentially a device for effecting a further storing, transmission or streaming of the recreated video thereof. Such devices include a diskette writer such a CD ROM writer or a DVD writer, a USB connection or any other connection for the transfer of the recreated video from one medium to the other in the same or different format or file types.

Figure 3:
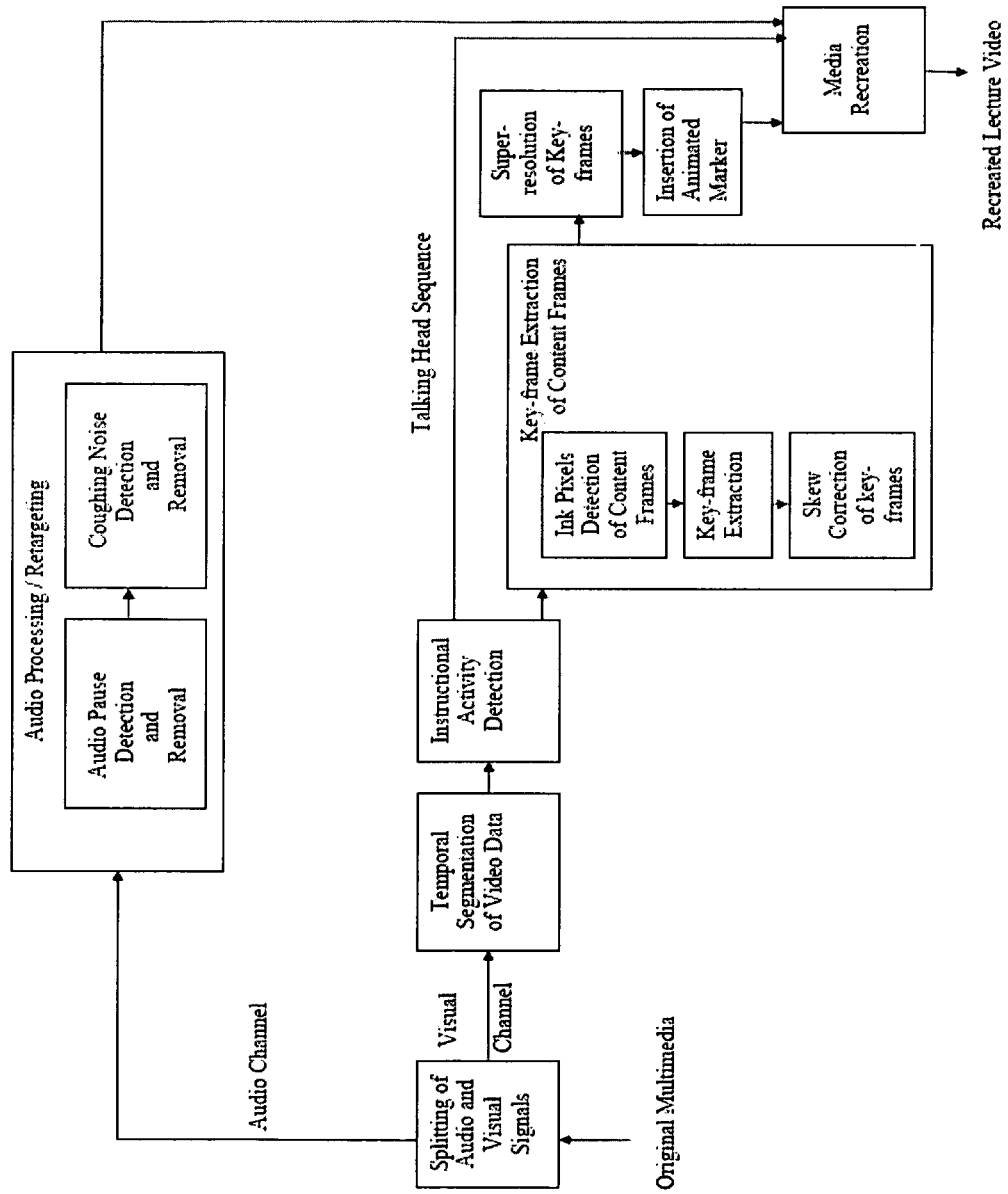
FIG. 3 illustrates a functional block diagram representing the steps involved in a method for automatically recreating a content preserving and compression efficient lecture video.

FIG. 3 illustrates a functional block diagram representing the steps involved in a method for automatically recreating a lecture video without losing the semantics therein. The original multimedia lecture video is first split into a video component and an audio component. For this, the audio track is separately read from the source for audio retargeting and the visual signal is converted into video frame sequences, using a video frame splitter. Here the composite media is split into its components and the reverse process is done in the media recreator. The video data is then fed into the scene change detector and the audio data is fed into the audio processing block and then to the media recreator. As a first and fundamental step in the semantic analysis, a temporal segmentation of the video data is executed to detect scene changes and determine scene breaks therein. To determine a scene break, a histogram difference is measured between two consecutive frames of the video data. If the sum of absolute difference of the histograms between two consecutive frames of the video data crosses a threshold, the frames are declared as shot boundary frames thereby determining a scene break. To increase the speed of calculation of the histogram difference, the original 256-level histogram of the video data is converted into a 16-bin histogram. A scene usually contains an activity like a talking head activity scene, a class room activity scene, a writing hand activity scene or a slide show activity scene. Such an activity detection of scenes is HMM (Hidden Markov Model) based and is carried out in two phases i.e. a training and a testing phase. During the training phase, the HMM parameters are learned based on which a scene would be classified into one of the above mentioned activities. For example, to classify a scene into a talking head activity scene, writing hand activity scene or a slide show activity scene, motion within the scene is taken into account for classification. Motion in a talking head activity scene is more than that of writing hand activity scene and the least in the slide show activity scene. Therefore, the energy of the temporal derivative in intensity space is used a relevant feature. The gray-level histogram gives the distribution of the image pixels over different intensity values. It is very sparse for the slide show activity scene, moderately sparse for the writing hand activity scene and dense for talking head activity scene. Hence the entropy of the histogram can be treated as another good feature for the detection of these activities. Histogram entropy is a direct measure of the variation of pixel intensity in an image. If there is a high variation of intensity, the entropy will be high and vice versa. So talking head sequence can be effectively discriminated from slide show or writing hand sequences.

In the aforesaid mentioned method for detecting activity in a scene, a HMM with Gaussian Mixture Model (GMM) assumption with two number of states is used. The Model is to be trained well, from previously selected instructional activity frames, before any test video is applied. Once it is trained, it is capable of categorizing the activity, according to the classes used to train it. Initially, the parameters of HMM are set with random values for each class of classification followed by Expectation-Maximization (EM) algorithm which within a few iterations gives well-tuned parameters for each class. In the testing phase, the algorithm computes the log-likelihood for each class of classification with respect to the features extracted from the test phase and assigns to a class which has the maximum log-likelihood. More specifically, in the training phase, three HMMs are constructed for each class mentioned and the features extracted from each class of lecture video frames are used to train them. In the testing phase, the features from the test video frames are fed to this and it calculates the log-likelihood for each class and recognizes the class based on these outputs. That class with the maximum log-likelihood is selected. If the HMM identify the current frames as content ones (writing hand or slide show classes), they are fed to key frame extraction module. Otherwise, they represent talking head sequences and a representative frame is taken as key frame. They are used by the video recreator to effect situational awareness.

In a subsequent step, after the classification of activity scenes, a key frame therein is to be determined in such a way that the key frame represents a summarized semantic content of the entire scene for a particular duration. A preliminary step in determining a key frame of the content activity scene is called ink pixel detection step. Pixels in each frames of the content scene are converted into ink and paper pixels corresponding to 0 and 255 values of gray levels respectively by means of a histogram thresholding technique. To reduce computation, only one frame in every 2 seconds is selected assuming that there isn't much variation of the visual content in two seconds of time. The reason why the pixel values are thresholded to get a bi-level content frame is mainly due to the following two facts: (a) These types of frames (content frames) can be best modeled by graphic images, which do not have a continuous spatial variation in intensity and an appropriate thresholding will not result in much loss of information, (b) a large saving in computation can be achieved by using a bi-level images which makes the algorithm very fast. Thus a fast key frame extraction can be performed by this ink-paper pixel conversion. Subsequently, a quantitative measure employing Horizontal Projection Profile (HPP) is employed on each ink and paper pixel detected frames by projecting the ink pixels in y-axis of the binary frame so as to form a M×1 column matrix of ink pixel count. Each element in the column matrix stands for the total number of ink pixel in a row of the processed frame. The principle of HPP holds under the assumption that the document does not suffer from any skew and the writing should be nearly horizontal and there should be no movement of the page as the writing by the instructor proceeds. Depending upon the teaching habits of the instructor, there may be two cases: first is that the same slide is being used and no additional material is being written or shown on it; second, that some additional material is being written on the same paper or slide. In the first case, the content of the video frame does not vary while in the second case, the content of the video frame varies but semantically what matters is the content on the slide at the end of the writing. For similar handwritten slides, printed or computer generated slides, the horizontal projection profiles for consecutive frames differ only negligibly. Hence variation in horizontal projection profile is a direct measure of dissimilarity in content which is used for the identification of a key frame. If this dissimilarity is high for two consecutive frames, the content of the current frame is determined to be deviating substantially from that of the previous one which indicates an introduction of a new slide or page. Consequently, the previous frame is declared to be a key frame.

Further to extraction of key frames, there is a possibility of multiple key frames corresponding to the same content frame being extracted. A reason for such a duplication of key frames is usually due to existence of skew within the content frame. To ascertain whether such duplicity of key frames exists, the Radon Transform (RT) of each of the key frames is computed in a range of −10 to +10 degrees in the intervals of 0.5 degrees. Subsequently, a correlation of RT of each of the key frames is performed to ascertain a similarity with the respective subsequent key frames. For this, the RT of the first declared keyframe is calculated for the reference direction and the correlation between this and the 21 RTs of the next key frame in different directions are computed using the well-known cross-correlation function. If any of them give a very high value, it is concluded that these key frames are similar and the second one is a duplicate. If the RTs of two consecutive key frames are distinctly dissimilar, the key frames are declared distinct. Else one of the duplicate key frame is deleted.

Subsequent to skew correction of key frames, selected key frames are ready for being merged to recreate the video data. However, a single key frame selected from a whole video sequence usually suffers from poor resolution when viewed as a static one due to the lower resolution employed by a video camera as opposed to the resolution offered by a still camera. To enhance the resolution of each key frame, the principle of super-resolution is applied thereon.

In the parallel path of audio retargeting, the associated audio signal is processed for the detection and removal of unnecessary and long pauses, disturbances like coughing noise, etc. to get a refined audio without any loss of content. For pause detection, a noise estimation technique is used to set up a threshold which helps to distinguish between speech and relatively long pause. Then speech segments are joined together to recreate the pause removed audio stream. To get rid of specific noise like coughing sounds, an HMM based technique is used. HMM is trained with the features from coughing sounds and then can be used to classify the test audio into either coughing signals or normal speech. Coughing sounds are removed from the audio stream, thereafter.

The final step of the method is media recreation wherein a synchronized time based merger of the selected and processed key frames is effected with the talking head sequence and associated recreated audio data to recreate a summarized and compressed estimate of the original lecture video. This recreated video does not suffer from any loss in terms of instructional values. The talking head sequence could be allowed to flow as such with the associated audio, possibly after appropriate down sizing to save memory. This helps in providing situational awareness to the student, who watches the recreated video. However, incase of a severe constraint on the bandwidth or due to any such reasons, the talking head sequence can be replaced by a static key frame of the instructor for the entire time slot. In the compressed time slot of the recreated video a key frame of the corresponding activity is displayed through the entire time slot although there is a transition or activity change being recorded in the original video during the corresponding time slot. The compression and summarization factor can be varied and depends upon the frequency of computer generated slide change or hand written pages and persistence of the talking head in the original video.

In the recreated video, an animated pointer or marker is shown on the content key frame, which helps the student to visually catch the word/line about which the instructor currently speaks. This marker moves vertically up or down according to the speed at which the instructor explains what he or she writes or what is there in the slides. The vertical location of the marker is obtained by detecting the location of pen (or cursor) on the content page. This provides additional situational awareness to the viewer.

Use of specific algorithms in executing the above method may not limit the invention. Choice of algorithm may vary and any other algorithm performing the same or substantially the same function may be used in the above described method.

According to the invention, the device and method recreates a content preserving and compression efficient lecture video which is summarized, compact in size and yet preserves the semantics of the video. The device and method does not involve any manual labour in editing out the unwanted portions in the lecture video without loosing the semantics therein.

Although the invention has been described with reference to a specific embodiment, this description is not meant to be construed in a limiting sense. Various modifications of the disclosed embodiment, as well as alternate embodiments of the invention, will become apparent to persons skilled in the art upon reference to the description of the invention. It is therefore contemplated that such modifications can be made without departing from the spirit or scope of the invention as defined.

The invention claimed is:

1. A device for automatically recreating a content-preserving and compression-efficient lecture video, said device comprising a computer-based video recreating means connected to a video receiving means at an input side thereof and to a video reproducing means at the output side thereof, said video recreating means being designed to
    split said video into visual data and audio data;
    split said visual data into a plurality of scenes by determining scene breaks within the visual data;
    classify each scene based on activities including one or more of a talking head activity scene, a class room activity scene, a writing hand activity scene and a slide show activity scene;
    select activity scenes pre-determined to be critical for preserving the semantics of said lecture video;
    determine a key frame within said selected activity scenes;
    recreate the visual data by effecting a time based merger of the key frames of the selected activity scenes;
    recreate the audio data by retargeting it to remove voiceless data and noise therein; and
    recreate the lecture video by effecting a synchronized time based merger of said recreated visual data and audio data.

2. The device of claim 1, wherein said video recreating means comprises a plurality of hardware units functioning independently of each other and controlled by a main hardware unit located within the device controlled by a user, each hardware unit performing a function or a combination of functions for recreating said lecture video.

3. The device of claim 1, wherein said video recreating means is designed to eliminate duplicate key frames generated after the determination of key frames by means of skew correction techniques.

4. The device of claim 1, wherein said video recreating means is designed to super-resolve the key frames for improved quality of representation.

5. The device of claim 1, wherein said video recreating means is designed to insert time stamped animated markers on the content key frames pointing to a location highlighted by an instructor.

6. A method for automatically recreating a content-preserving and compression-efficient lecture video, said method comprising the steps of
    splitting said video into visual data and audio data;
    splitting said visual data into a plurality of scenes by determining scene breaks within the visual data;
    classifying each scene based on activities including one or more of a talking head activity scene, a class room activity scene, a writing hand activity scene and a slide show activity scene;
    selecting activity scenes pre-determined to be critical for preserving the semantics of said lecture video;
    determining a key frame within said selected activity scenes;
    recreating the visual data by effecting a time based merger of the key frames of the selected activity scenes;
    recreating the audio data by retargeting it to remove voiceless data and noise therein; and
    recreating the lecture video by effecting a synchronized time based merger of said recreated visual data and audio data.

7. The method of claim 6, wherein said scene breaks are determined by effecting temporal segmentation of said visual data.

8. The method of claim 6, wherein said classification of the scenes is performed by means of algorithms based on Hidden Markov Model (HMM).

9. The method of claim 6, wherein the content of key frames is obtained through one or more ink pixels detection techniques.

10. The method of claim 6, wherein said key frame is determined by means of key frame extraction algorithm using one or more Horizontal Projection Profile (HPP) principles.

11. The method of claim 6, wherein said key frame is skew-corrected by means of a Radon Transform (RT) algorithm.

12. The method of claim 6, wherein a key frame is enhanced by means of a principle of super-resolution technique.

13. The method of claim 6, wherein a time-stamped animated marker is inserted on the content key frame, based on a location highlighted by an instructor.

14. The method of claim 6, wherein a static key frame of the talking head activity scene is used instead of the talking head activity scene.

15. The method of claim 6, wherein the audio data is processed to remove unwanted and long pauses, coughing and other disturbances.

16. The method of claim 6, wherein said multimedia lecture video is recreated from key-frames and audio data.

17. The device of claim 1, wherein a static key frame of the talking head activity scene is used instead of the talking head activity scene.

* * * * *